United States Patent [19]

Kennedy, Jr. et al.

[11] Patent Number: 5,511,195
[45] Date of Patent: Apr. 23, 1996

[54] DRIVER, COMPUTER-IMPLEMENTED PROCESS, AND COMPUTER SYSTEM FOR PROCESSING DATA USING LOADABLE MICROCODE RUNNING ON A PROGRAMMABLE PROCESSOR

[75] Inventors: Howard J. Kennedy, Jr., Hamilton Sq., N.J.; Terry Downs, Forest Grove; Josh Herman, Beaverton, both of Oreg.

[73] Assignee: Intel Corporation, Santa Clara, Calif.

[21] Appl. No.: 152,348

[22] Filed: Nov. 12, 1993

[51] Int. Cl.$^6$ ................................................ G06F 9/22
[52] U.S. Cl. ........................... 395/650; 364/DIG. 1; 364/228.5; 364/231.6; 364/281.7
[58] Field of Search .................................... 395/164, 163, 395/162, 650, 700

[56] References Cited

U.S. PATENT DOCUMENTS

| | | |
|---|---|---|
| 2,686,220 | 8/1954 | Sziklai et al. . |
| 3,519,736 | 7/1970 | Dorsey . |
| 4,109,244 | 8/1978 | Barnich et al. . |
| 4,115,765 | 9/1978 | Hartke . |
| 4,439,761 | 3/1984 | Fleming et al. . |
| 4,910,683 | 3/1990 | Bishop et al. . |
| 4,928,253 | 5/1990 | Yamauchi et al. . |
| 5,031,224 | 7/1991 | Mengel et al. . |
| 5,081,450 | 1/1992 | Lucas et al. . |
| 5,129,011 | 7/1992 | Nishikawa et al. . |
| 5,153,936 | 10/1992 | Morris et al. . |
| 5,262,767 | 11/1993 | Takeda . |
| 5,300,949 | 4/1994 | Rodriquez et al. . |
| 5,418,962 | 5/1995 | Bodin et al. .......................... 395/700 |

*Primary Examiner*—Thomas M. Heckler
*Attorney, Agent, or Firm*—Steve Mendelsohn; William H. Murray

[57] ABSTRACT

First and second application programs run on a host processor. The driver loads, runs, and unloads a first microcode program of the first application program onto an Intel® i750® Pixel Processor. The driver then loads, runs, and unloads a second microcode program of the second application program onto the Intel® i750® Pixel Processor. The driver repeats these steps such that the first and second application programs run concurrently.

40 Claims, 8 Drawing Sheets

FIG. 1. HARDWARE ARCHITECTURE

FIG. 2. SOFTWARE ARCHITECTURE

FIG. 3. DECOMPRESSION AND DISPLAY PROCESSING

FIG. 4. CAPTURE AND COMPRESSION PROCESSING

FIG. 5. MONITORING OF CAPTURE/COMPRESSION PROCESSING

FIG. 6. VIDEO DRIVER

FIG. 7. DISPLAYING FULL-SCREEN VIDEO IMAGES

FIG. 8. COORDINATION OF BACKGROUND/FOREGROUND COMMANDS

DRIVER, COMPUTER-IMPLEMENTED PROCESS, AND COMPUTER SYSTEM FOR PROCESSING DATA USING LOADABLE MICROCODE RUNNING ON A PROGRAMMABLE PROCESSOR

BACKGROUND OF THE INVENTION

1. Field of the Invention

The present invention relates to data processing, and, in particular, to drivers, computer-implemented processes, and computer systems for processing data using a programmable processor.

2. Description of the Related Art

Personal computer (PC) systems for capturing and compressing video signals and for decompressing and displaying compressed video signals on a computer monitor are known. Some such PC systems have a general-purpose host processor and a special-purpose video hardware subsystem. These PC systems may also have an application program, a general-purpose video software program, and a special-purpose video driver running on the host processor, and special-purpose video-processing microcode running on the special-purpose video hardware subsystem.

To process video data, the application program interfaces with the general-purpose video software program. The video software program in turn interfaces with the special-purpose video driver. The video driver also interfaces with the special-purpose video-processing microcode which runs on the video hardware subsystem.

For example, the host processor may be an Intel® 486 microprocessor, the video hardware subsystem may be an Intel® Smart Video Recorder card or other hardware based on an Intel® i750® Pixel Processor, and the video software program may be a version of Microsoft® Video for Windows. The video driver and the video-processing microcode may be delivered with the video hardware subsystem. The video-processing microcode that is provided with the video hardware subsystem performs compression and decompression of video data using specific video algorithms.

It is desirable for users of video hardware subsystems to be able to run microcode on those subsystems other than the video-processing microcode provided with the subsystems. For example, a user may wish to implement video compression and/or decompression algorithms different from those supported by the provided video-processing microcode. In addition or alternatively, a user may wish to perform data processing other than that supported by the provided video-processing microcode. This data processing need not even be related to the processing of video data.

Under the known PC systems described above, it is difficult for a user to process data on a video hardware subsystem other than by the algorithms supported by the video-processing microcode provided with the subsystem. For example, it currently is difficult for a user to program a pixel processor such as an Intel® i750® Pixel Processor to implement algorithms other than those supported by the video-processing algorithms provided with the pixel processor.

Furthermore, the special-purpose video hardware subsystems and special-purpose video drivers of the known PC systems constitute closed architectures. That is, the video driver is designed specifically for the particular video hardware subsystem and is not easily modified to support alternative hardware configurations. As a result, each generation of improved and upgraded hardware subsystem requires extensive modification to the video driver.

It is accordingly an object of this invention to overcome the disadvantages and drawbacks of the known art and to provide a video driver that permits a user to program easily a video hardware subsystem of a PC system.

It is a particular object of the present invention to provide a video driver that permits a user to program easily a pixel processor such as a version of the Intel® i750® Pixel Processor.

It is a further object of the present invention to provide a video driver that provides an interface between the video hardware subsystem of a PC system and a video software program running on a host processor, where the video driver permits a user to implement compression and/or decompression algorithms different from those already supported by the video driver and video-processing microcode that are provided with the video hardware subsystem.

It is a particular object of the present invention to provide a video driver that provides an interface between a pixel processor such as a version of the Intel® i750® Pixel Processor and a version of Microsoft® Video for Windows running on a host processor such as an Intel® 486 processor, where the video driver permits a user to implement compression and/or decompression algorithms different from those already supported by the video-processing microcode that is provided with the pixel processor.

It is a further object of the present invention to provide a video driver that may be easily modified to support alternative video hardware subsystem configurations.

It is a particular object of the present invention to provide a video driver that is easily modified to support improved and upgraded versions of pixel processors.

It is a further object of the present invention to provide computer-implemented processes and computer systems based on the video drivers described above.

It is a further object of the present invention to provide computer-implemented processes, video hardware subsystems, and computer systems for displaying full-screen video images on computer monitors without having to create scaled bitmaps.

It is a further object of the present invention to provide computer-implemented processes and computer systems for processing video data for display on raster-based monitors.

Further objects and advantages of this invention will become apparent from the detailed description of a preferred embodiment which follows.

SUMMARY OF THE INVENTION

The present invention is a computer-implemented process, a driver, and a computer system for processing data with an Intel® i750® Pixel Processor. The driver loads, runs, and unloads a first microcode program of a first application program onto the Intel® i750® Pixel Processor. The driver then loads, runs, and unloads a second microcode program of a second application program onto the Intel® i750® Pixel Processor. The driver repeats these steps so that the first and second application programs run concurrently on a host processor.

BRIEF DESCRIPTION OF THE DRAWINGS

Other objects, features, and advantages of the present invention will become more fully apparent from the following detailed description of the preferred embodiment, the appended claims, and the accompanying drawings in which:

DESCRIPTION OF THE PREFERRED EMBODIMENT(S)

The present invention is directed to a video driver for a video hardware subsystem, such as a video-processing card with a version of the Intel® i750® Pixel Processor, where the video driver permits a user to program the video hardware subsystem easily. In a preferred configuration, the video driver provides an interface between a general-purpose video software program running on a general-purpose host processor (e.g., a version of Microsoft® Video for Windows software running on an Intel® 486 microprocessor) and a video hardware subsystem. In this configuration, the user may choose to compress and/or decompress video data using algorithms provided with the video hardware subsystem or using alternative algorithms provided by the user. The user may also use the video driver—to program the video hardware subsystem to implement functions other than video compression and decompression.

Figure 1:
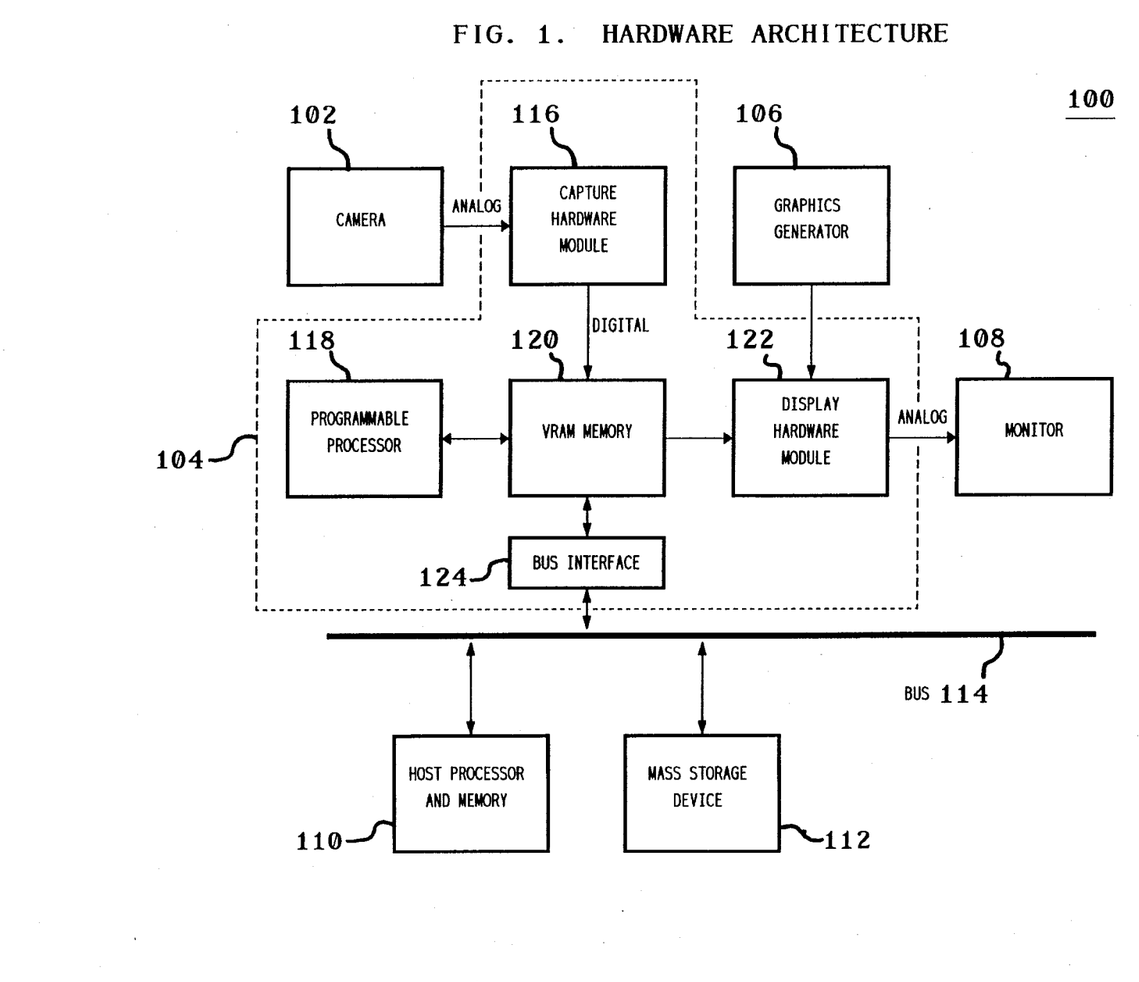
FIG. 1 is a block diagram of the hardware architecture of a video system according to a preferred embodiment of the present invention.

Referring now to FIG. 1, there is shown a block diagram of the hardware architecture of video system 100, according to a preferred embodiment of the present invention. Video system 100 comprises video hardware subsystem 104, video camera 102, graphics generator 106, monitor 108, host processor and memory 110, mass storage device 112, and bus 114. Video hardware subsystem 104 comprises capture hardware module 116, programmable processor 118, VRAM memory device 120, display hardware module 122, and bus interface 124.

Video system 100 may be used to decompress video data stored in mass storage device 112 for display on monitor 108. Video system 100 may also be used to capture and compress video signals generated by camera 102. In addition, video system 100 is capable of displaying video images on monitor 108 during capture and compression processing. The displayed video images during capture and compression processing may be either the raw captured video images or the companded images generated during video compression (i.e., the results of decompressing the compressed video data).

Figure 2:
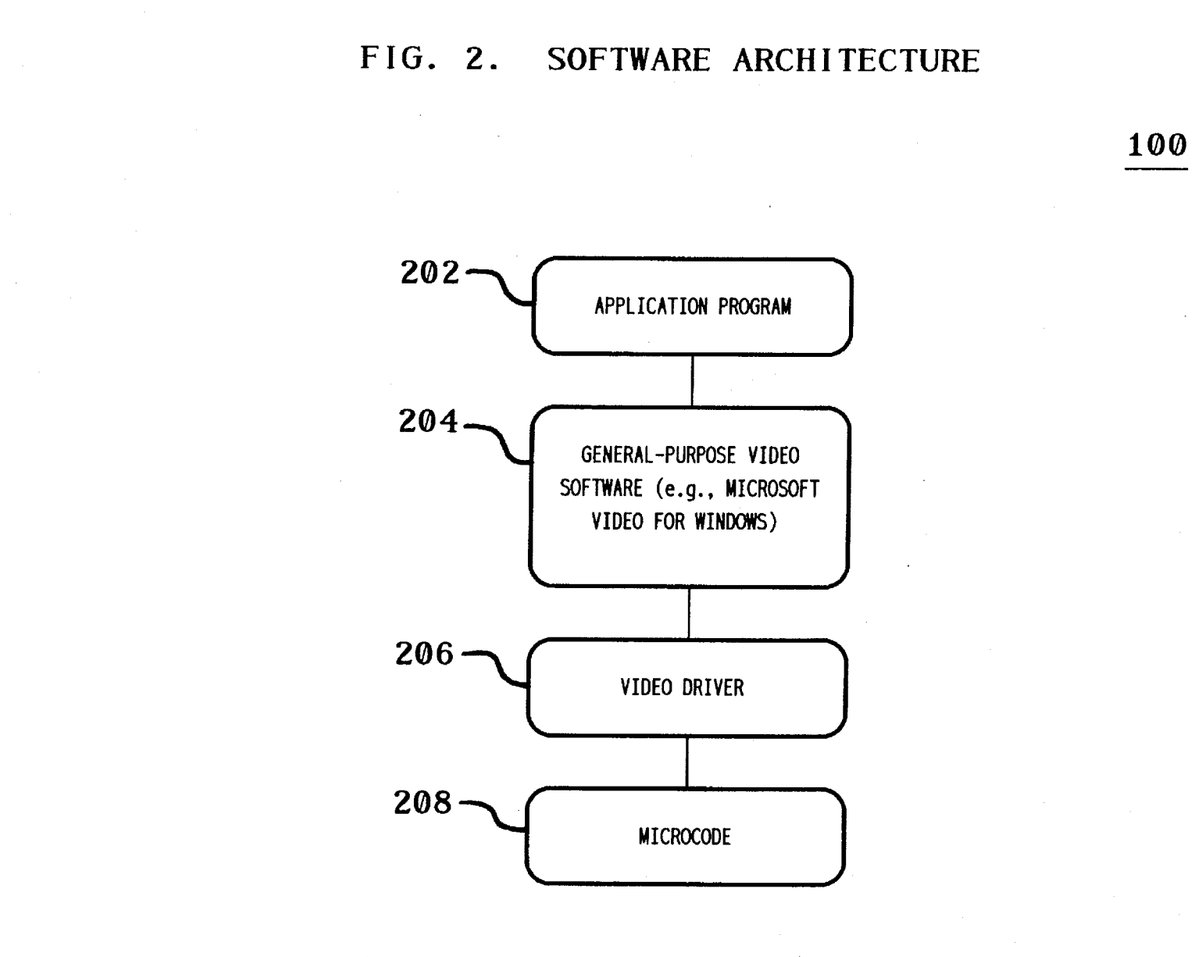
FIG. 2 is a block diagram of the software architecture of the video system of FIG. 1.

Referring now to FIG. 2, there is shown a block diagram of the software architecture of video system 100 of FIG. 1, according to a preferred embodiment of the present invention. Application program 202, general-purpose video software program 204, and video driver 206 run on host processor 110 of FIG. 1. Microcode 208 runs on the processors and modules of video hardware subsystem 104 of FIG. 1.

VIDEO PROCESSING

Figure 3:
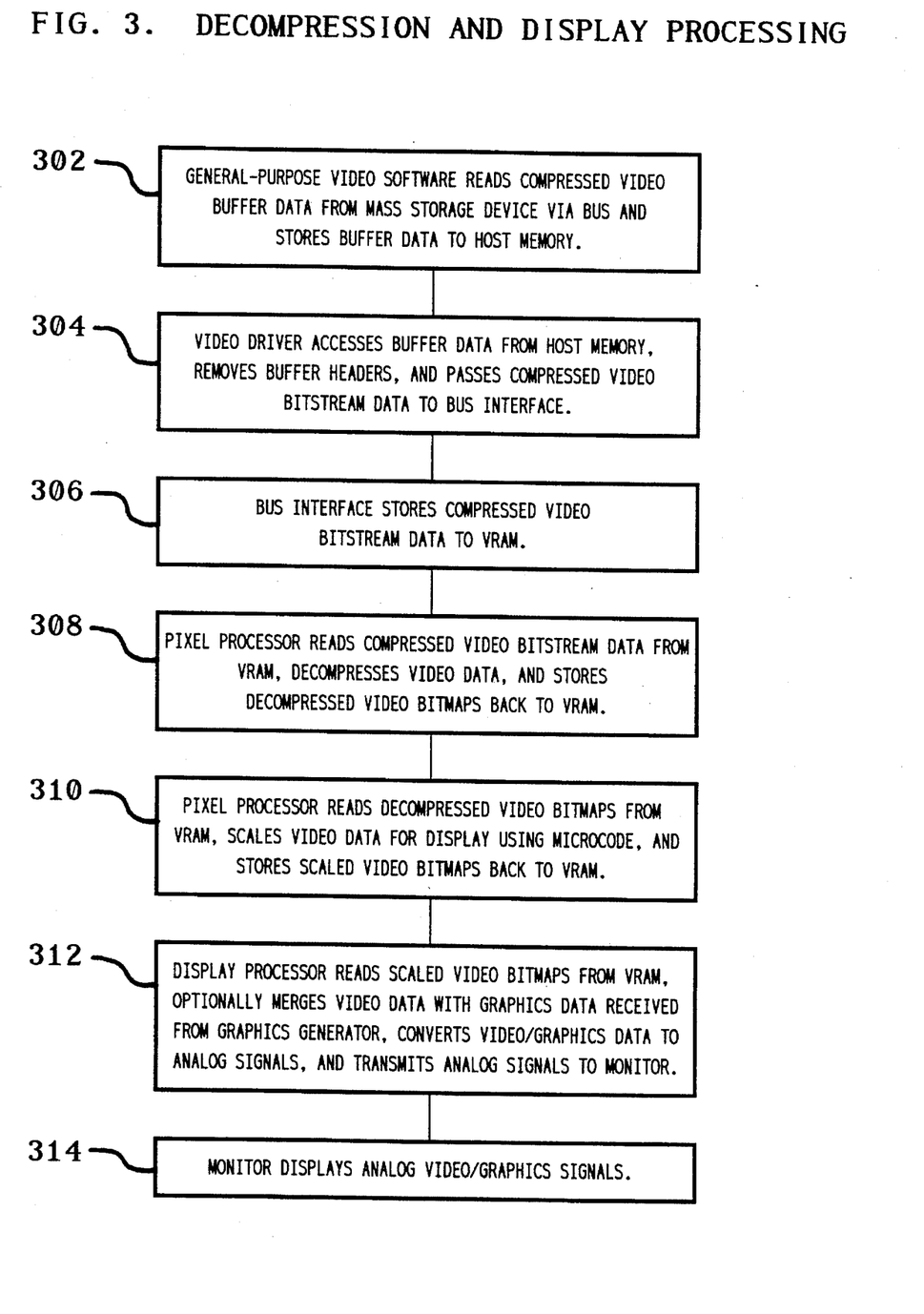
FIG. 3 is a process flow diagram of the decompression and display processing implemented by the video system of FIGS. 1 and 2.

Referring now to FIG. 3, there is shown a process flow diagram of the decompression and display processing implemented by video system 100 of FIGS. 1 and 2, according to a preferred embodiment of the present invention. In decompression and display processing, video software program 204 reads compressed video buffer data from mass storage device 112 via bus 114 and passes the buffer data to video driver 206 (block 302 of FIG. 3). Video driver 206 passes compressed video bitstream data to bus interface 124 via bus 114 (block 304). Bus interface 124 stores the compressed video bitstream data to VRAM 120 (block 306).

Programmable processor 118 reads the compressed video bitstream data from VRAM 120, decompresses the video data using microcode 208, and stores decompressed video bitmaps back to VRAM 120 (block 308). The microcode used by programmable processor 118 to decompress the video data is selected by the host processor. The selection is based on the information stored in the compressed bitstream header and a list of available algorithms listed in a configuration file. The user may choose to use the video decompression algorithms provided with the video driver 206 or implement alternative video decompression algorithms that are compatible with video driver 206. The microcode used to implement these alternative decompression algorithms may be developed by the user or other third parties.

Programmable processor 118 reads the decompressed video bitmaps from VRAM 120, scales the video data for display, and stores scaled video bitmaps back to VRAM 120 (block 310). Display hardware module 122 reads the scaled video bitmaps from VRAM 120, optionally merges the video data with graphics data received from graphics generator 106, converts the digital video/graphics data to analog video/graphics signals, and transmits the analog video/graphics signals to monitor 108 (block 312). Monitor 108 displays the analog video/graphics signals (block 314).

Figure 4:
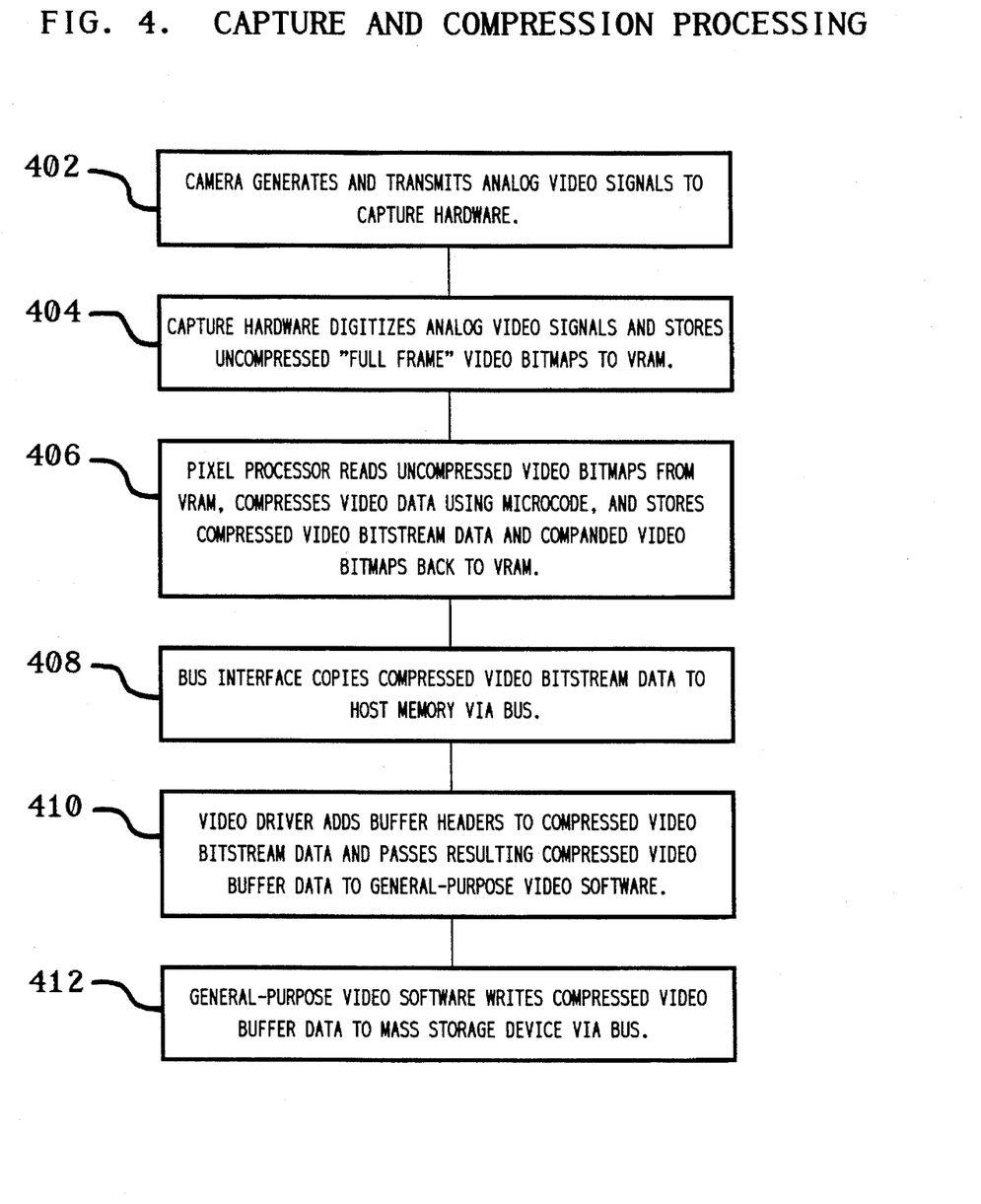
FIG. 4 is a process flow diagram of the capture and compression processing implemented by the video system of FIGS. 1 and 2.

Referring now to FIG. 4, there is shown a process flow diagram of the capture and compression processing implemented by video system 100 of FIGS. 1 and 2, according to a preferred embodiment of the present invention. In capture and compression processing, camera 102 of video system 100 generates and transmits analog video signals to capture hardware module 116 (block 402 of FIG. 4). Capture hardware module 116 digitizes the analog video signals and stores uncompressed "full frame" video bitmaps to video random access memory (VRAM) device 120 (block 404). In a preferred embodiment, capture hardware module 116 captures video data as subsampled YUV 4:1:1 bitmaps (i.e., 9 bits per pixel). In alternative preferred embodiments, other video data formats may be used.

Programmable processor 118 reads the uncompressed video bitmaps from VRAM 120, compresses the video data using microcode 208, and stores compressed video bitstream data and companded video bitmaps back to VRAM 120 (block 406). The user selects the microcode used by programmable processor 118 to compress the video data. The user may choose to use the video compression algorithms provided with video driver 206 or user implemented alternative video compression algorithms that are compatible with video driver 206. The microcode used to implement these alternative compression algorithms may be developed by the user or other third parties.

Bus interface 124 copies the compressed video bitstream data to host memory 110 via bus 114 (block 408). Video driver 206 passes the video buffer data to general-purpose video software program 204 (block 410). Video software program 204 writes the compressed video buffer data to mass storage device 112 via bus 114 (block 412).

Figure 5:
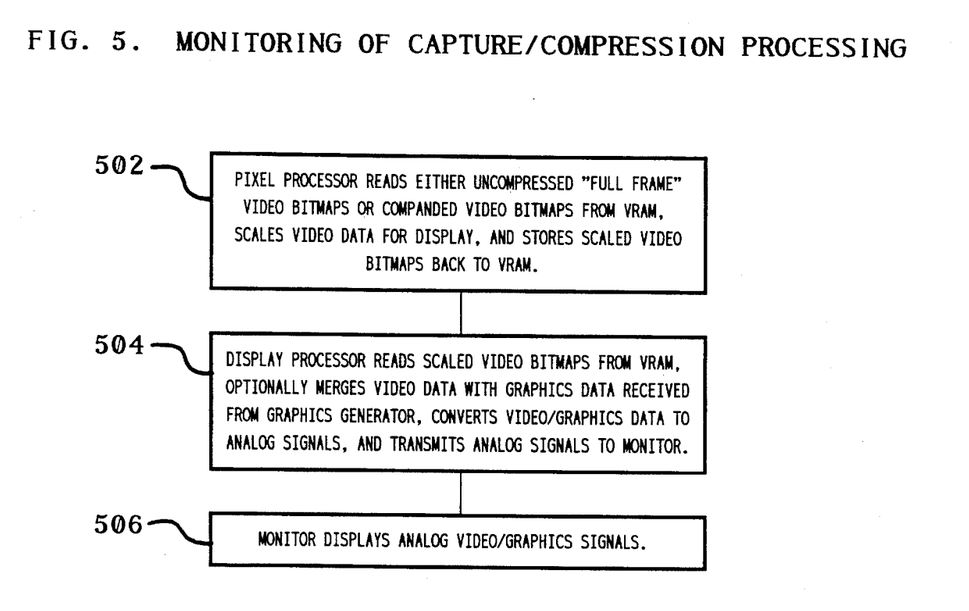
FIG. 5 is a process flow diagram of the monitoring of capture/compression processing implemented by the video system of FIGS. 1 and 2.

Referring now to FIG. 5, there is shown a process flow diagram of the monitoring of capture/compression processing implemented by video system 100 of FIGS. 1 and 2, according to a preferred embodiment of the present invention. In capture/compression monitoring, programmable processor 118 reads either the uncompressed "full frame" video bitmaps or the companded video bitmaps from VRAM 120, scales the video data for display, and stores scaled video bitmaps back to VRAM 120 (block 502 of FIG. 5). If the uncompressed "full frame" video bitmaps are selected, the capture/compression monitoring monitors the video data as it is captured. If the companded bitmaps are selected, then capture/compression monitoring monitors the video data after the image has been compressed and decompressed ("companded").

Display hardware module 122 reads the scaled video bitmaps from VRAM 120, optionally merges the video data with graphics data received from graphics generator 106, converts the video/graphics data to analog video/graphics signals, and transmits the analog video/graphics signals to monitor 108 (block 504). Monitor 108 displays the analog video/graphics signals (block 506).

Referring again to FIG. 1, camera 102 may be any suitable video camera that generates analog video signals supported by video system 100. In other preferred embodiments, the analog video signals may be generated by an alternative local source such as a VCR or laserdisc. Capture hardware module 116 may be any suitable module for digitizing analog video signals and capturing digital video bitmaps and is preferably an Intel® ActionMedia® II Capture Module.

Memory 120 may be any suitable computer memory device for storing data during video processing such as a random access memory (RAM) device and is preferably a video RAM (VRAM) device with at least 2 megabytes of data storage capacity. Programmable processor 118 may be any suitable processor for compressing and decompressing video data and is preferably a version of the Intel® i750® Pixel Processor. Bus interface 124 may be any suitable hardware for transmitting data from VRAM 120 to bus 114 and for receiving data from bus 114 for storage to VRAM 120. Bus 114 may be any bus suitable for communicating data and is preferably an Industry Standard Architecture (ISA) PC bus.

Display hardware module 122 may be any suitable module for processing and merging scaled video bitmap data with graphics data for display on a suitable monitor and is preferably a version of the Intel® i750® Display Processor. Graphics generator 106 may be any suitable source of graphics data and preferably generates VGA graphics data. In an alternative preferred embodiment, graphics generator 106 is optional and may be remove entirely. In another alternative preferred embodiment, the functions of graphics generator 106 may be implemented by display hardware module 122, in which case graphics generator 106 may be considered part of video hardware subsystem 104. Monitor 108 may be any suitable device for displaying analog video/graphics data and is preferably a VGA monitor.

Host processor 110 may be any suitable general-purpose processor and is preferably an Intel® 486 microprocessor. Those skilled in the art will understand that alternative preferred embodiments of the present invention may use another Intel® processor such as an Intel® 386 or Pentium microprocessor. Host processor 110 preferably has at least 4 megabytes of host memory.

Mass storage device 112 may be any suitable device for storing compressed video data and is preferably a hard disk drive having at least 100 megabytes of data storage capacity. Those skilled in the art will understand that, in alternative preferred embodiments, the source of compressed video data may be a CD-ROM player. It will also be understood that alternative preferred embodiments of the video system of the present invention may be used to transmit and receive compressed video data to and from one or more remote locations. As such, the video system of the present invention may be one node of a local or wide area network communicating via various media such as an Ethernet bus or T1 lines. Under such configurations, the video system of the present invention may support various video functions such as teleconferencing, broadcasting, and multicasting.

Referring again to FIG. 2, application program 202 may be any suitable application-level software that requires video processing. General-purpose video software program 204 may be any suitable program for interfacing between application program 202 and video driver 206 and is preferably a version of Microsoft® Video for Windows software program. Alternatively, general purpose video software program 204 may be Apple QuickTime® for Windows. As described earlier, microcode 208 may comprise the video compression/decompression software provided with video hardware subsystem 104. Alternatively, microcode 208 may be video compression and/or decompression software provided by the user or other third party.

VIDEO DRIVER

Figure 6:
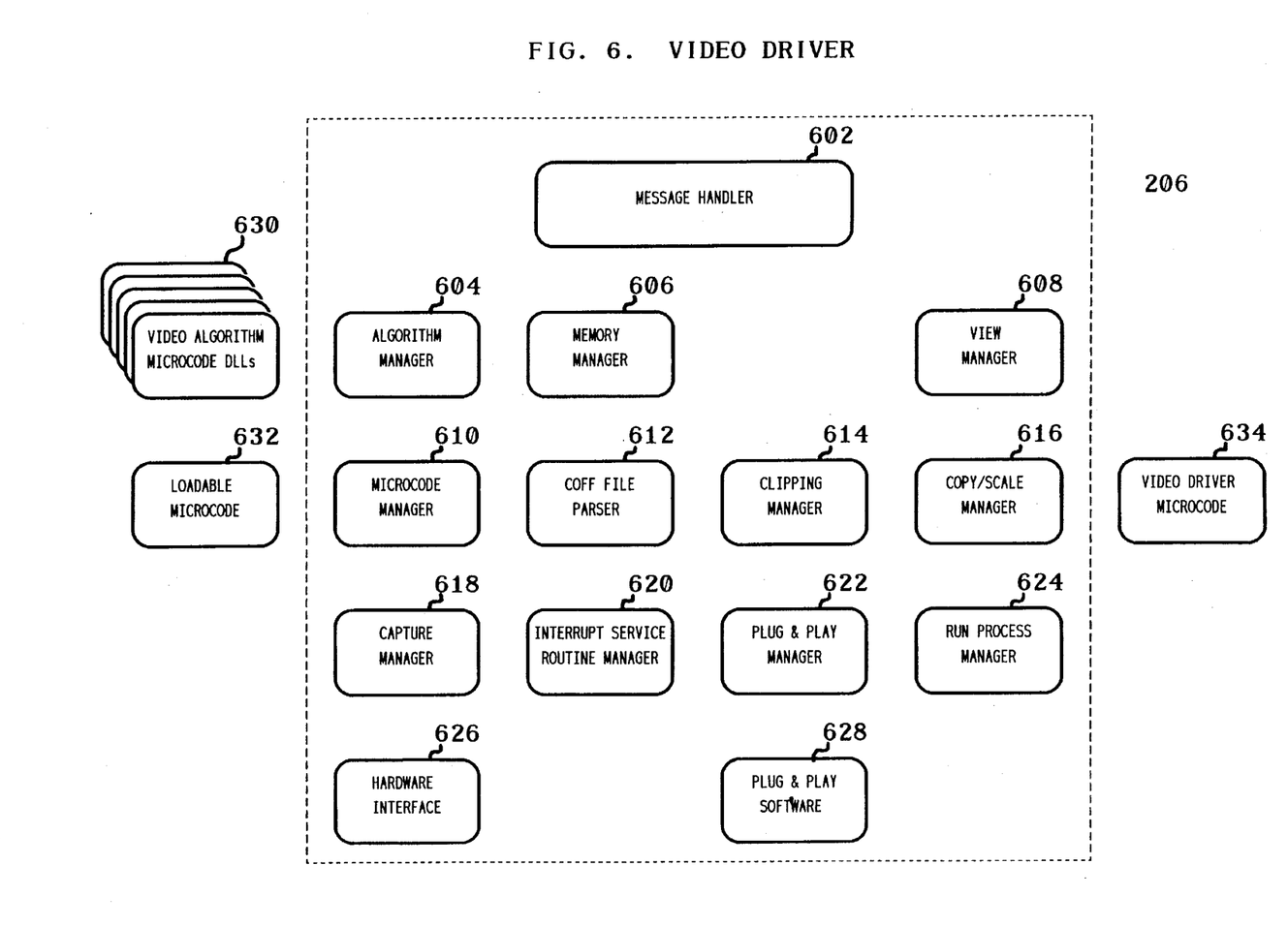
FIG. 6 is a representation of the video driver of FIG. 2.

Referring now to FIG. 6, there is shown a representation of video driver 206 of FIG. 2, according to a preferred embodiment of the present invention. Video driver 206 comprises a number of software modules that reside on host processor 110 of FIG. 1. These software modules provide the interfaces with general-purpose video software program 204 running on host processor 110 and microcode 208 running on video subsystem 104. In the preferred embodiment of FIGS. 1 and 2, general-purpose video software program 204 is a version of Microsoft® Video for Windows software program (VfW).

Video driver 206 provides or supports the following capabilities:

Receipt and handling of messages to and from VfW for video data processing (message handler 602).

Selection and loading of microcode onto video hardware subsystem 104 for implementing video processing within the VfW environment (algorithm manager 604).

Allocation of memory space within VRAM 120 (memory manager 606).

Implementation of copy/scale function by video hardware subsystem 104 (copy/scale manager 616).

Implementation of full-screen display of video images by video hardware subsystem 104 (view manager 608).

Implementation of video window clipping (clipping manager 614).

Capturing of analog video signals by video hardware subsystem 104 (capture manager 618).

Managing of interrupt service routines (interrupt service routine manager 620).

Managing "plug & play" capabilities of video hardware subsystem (plug & play manager 622).

Implementation of background and foreground commands on video hardware subsystem 104 (run process manager 624).

Loading and convening of object files (COFF file parser 612).

Selection, loading, and running of microcode on video hardware subsystem 104 outside of the VfW environment (microcode manager 610).

These capabilities are described in greater detail in the following sections of the specification.

HANDLING MICROSOFT® VIDEO FOR WINDOWS MESSAGES

Message handler 602 of video driver 206 handles the messages required to interface with Microsoft® Video for Windows. These messages include:

Draw stream messages for displaying video data on monitor 108.

Decompression stream messages for decompressing a stream of compressed video data.

Compression stream messages for compressing a stream of uncompressed video data.

Capture stream messages for capturing analog video signals as digital video data.

General messages handled by all Microsoft® Windows device drivers, including Open/Close/Load/Free etc. Those skilled in the art will understand that these messages are required for any Microsoft® Windows 3.1 device driver.

Those skilled in the art will understand that message handler 602 is designed to meet the requirements of Microsoft® Video for Windows.

SELECTION AND LOADING OF VIDEO-PROCESSING MICROCODE

Algorithm manager 604 handles the selection and loading of video algorithm microcode 630 for implementing video compression and/or decompression algorithms on programmable processor 118 within the Microsoft® Video for Windows environment. As such, algorithm manager 604 provides the interface between video driver 206 and external libraries for implementing compression/decompression algorithms. In a preferred embodiment, the external libraries are dynamically linked libraries (DLLs) under the Microsoft® Windows graphical user interface. In alternative preferred embodiments, the external libraries may operate under DOS, OS/2, MAC, and UNIX operating systems. As described earlier, a user of video system 100 may process video data using the compression/decompression algorithms supported by the microcode provided with video hardware subsystem 104. Alternatively, the user may process video data using video-processing microcode not provided with video hardware subsystem 104. This microcode may implement video compression and/or decompression algorithms different from the microcode provided with video hardware subsystem 104.

A DLL containing video algorithm microcode 630 is installed for use by video driver 206 by inserting specific information in the [drivers] and [Indeo_Algs] sections of the SYSTEM.INI file of Microsoft® VfW. Specifically, the [drivers] section is updated by adding a configuration line of the following format:

*VIDC.4 cc=draw1.drv* where 4 cc is the four-character code assigned to the algorithm to be loaded. The [drivers] section may have one or more of these configuration lines, each with a different four-character code.

The user-defined [Indeo_Algs] section is created or updated by adding a configuration line of the following format:

4 *cc=DLLname.dll*, Long name of *alg*, flags where flags indicates the type of algorithm (i.e., E for encode, D for decode, and B for both encode and decode). DLLname may include path, but is limited to 128 characters. Long name of alg may be up to 30 characters in length.

For video compression, Microsoft® VfW tells video driver 206 to select the video compression algorithm to run. Video driver 206 responds by returning the header that identifies which compression algorithm is being used. For video decompression, Microsoft® VfW examines the header of the compressed bitstream to determine the video decompression algorithm to be used. Microsoft® VfW then sends video driver 206 a message identifying the appropriate decompression algorithm to be used.

To be successfully loaded and used by video driver 206, the algorithm DLL is preferably designed with the following constraints:

The algorithm DLL is designed for Microsoft® Windows version 3.1 or later.

The algorithm DLL is coded to the Loadable Algorithm Interface specification.

Video driver 206 communicates with the loaded algorithm DLL by making calls to a message function called alg_proc() within the DLL and passing messages to it. The alg_proc() function is written to match the following calling parameters delivered by video driver 206:

dwAlgInstId—A DWORD variable that identifies the algorithm instance.

uiAlgMsg—A UINT variable that forms the message to the algorithm DLL.

lparam1—A generic long variable used to pass values of unknown type.

lparam2—A generic long variable used to pass values of unknown type.

The following are the messages delivered to alg_proc() and the definition of associated parameters passed.

ALG_OPEN

Video driver 206 sends an ALG_OPEN message to instruct the algorithm DLL to allocate any instance data required for processing and return a handle unique to that instance. The values of the alg_proc() parameters associated with ALG_OPEN are:

dwAlgInstId—Undefined uiAlgMsg—ALG_OPEN lparam1—Far pointer to a DWORD to be filled in with a unique instance handle for this opening of the algorithm DLL. This handle ID will be passed back to the algorithm DLL during subsequent calls to alg_proc().

lparam2—Far pointer to a LITEFUNCS structure containing far pointers to video driver functions needed by the algorithm DLL.

The LITEFUNCS structure contains far pointers to the following video driver functions:

*pfLoadUcode (Filename, VramPtr, hModule)—Loads microcode from disk into VRAM.

*pfUnLoadUcode (Filename, VramPtr)—Unloads microcode from VRAM.

*pfHost2Vram (HostPtr, HostOff, VramPtr, Len)—Transfers data from the host to VRAM.

*pfVram2Host (VramPtr, HostPtr, HostOff, Len)—Transfers data from VRAM to the host.

*pfAm2ReadShort (VramPtr)—Reads a SHORT value from VRAM and returns it.

*pfAm2ReadLong (VramPtr)—Reads a LONG value from VRAM and returns it.

*pfAllocVMem (Size, Align)—Allocates a VRAM buffer. Returns VRAM pointer.

*pfFreeVMem (VramPtr)—Frees a VRAM buffer.

*pfResource2Vram (Resource, VramPtr, hModule)—Loads a resource file into VRAM.

In these video driver functions,

Filename=name of microcode file.

VramPtr=pointer to location in VRAM.

hModule=Microsoft® Windows handle to a module containing a desired resource.

HostPtr=pointer to location in host memory.

HostOff=offset from host memory location.

Len=length of data to be transferred.

Size=size of buffer to be allocated.

Align=Boundary on which code/data must start (e.g., segment, paragraph, word).

Resource=name of resource file.

ALG_CLOSE

Video driver 206 sends an ALG_CLOSE message to instruct the algorithm DLL to free any instance data associated with this instance. The values of the alg_proc() parameters associated with ALG_CLOSE are:

dwAlgInstId—The algorithm instance identifier.

uiAlgMsg—ALG_CLOSE.

lparam1—Undefined.

lparam2—Undefined.

ALG_LOAD_PLAYBACK

Video driver 206 sends an ALG_LOAD_PLAYBACK message to instruct the algorithm DLL to load all resources and microcode associated with playback. The values of the alg_proc() parameters associated with ALG_LOAD_PLAYBACK are:

dwAlgInstId—The algorithm instance identifier.

uiAlgMsg—ALG_LOAD_PLAYBACK.

lparam1—Far pointer to a STREAMALGINFO structure.

lparam2—Far pointer to a BITMAPINFOHEADER structure of Microsoft® VfW.

The STREAMALGINFO structure contains the following parameters:

AlgInst—Algorithm open instance handle.

AlgEntryPoint—VRAM address of the algorithm DLL entry point.

*pCodecArgs—Far pointer to CODEC_ARGS structure.

CodecArgsSize—Size of CODEC_ARGS structure plus extra algorithm DLL space.

The CODEC_ARGS structure contains the following parameters:

CODEC_ARGS_HDR Hdr—Common CODEC_ARGS header (filled in by video driver 206).

VWORD AlgSpecific[0]-Algorithm-specific codec arguments of variable length.

The CODEC_ARGS_HDR structure contains the following parameters:

PrevBitmap[3]—VRAM addresses of previous Y, V, and U bitmaps, respectively.

CurBitmap[3]—VRAM addresses of current Y, V, and U bitmaps, respectively.

Pitch[3]—Pitches of Y, V, and U bitmaps, respectively.

CompressedBuf—VRAM address of the compressed data buffer.

Those skilled in the art will understand that video driver 206 supports color formats other than YUV, such as RGB, YIQ, and HSV.

ALG_UNLOAD_PLAYBACK

Video driver 206 sends an ALG_UNLOAD_PLAYBACK message to instruct the algorithm DLL to free the playback microcode and any resources used for this instance. The values of the alg_proc() parameters associated with ALG_UNLOAD_PLAYBACK are:

dwAlgInstId—The algorithm instance identifier.

uiAlgMsg—ALG_UNLOAD_PLAYBACK.

lparam1—Undefined.

lparam2—Undefined.

ALG_LOAD_CAPTURE

Video driver 206 sends an ALG_LOAD_CAPTURE message to instruct the algorithm DLL to load all resources and microcode associated with capture. The values of the alg_proc() parameters associated with ALG_LOAD_CAPTURE are:

dwAlgInstId—The algorithm instance identifier.

uiAlgMsg—ALG_LOAD_CAPTURE.

lparam1—Far pointer to a STREAMALGINFO structure.

lparam2—Far pointer to a BITMAPINFOHEADER structure of Microsoft® VfW.

ALG_UNLOAD_CAPTURE

Video driver 206 sends an ALG_UNLOAD_CAPTURE message to instruct the algorithm DLL to free the capture microcode and any resources used for this instance. The values of the alg_proc() parameters associated with ALG_UNLOAD_CAPTURE are:

dwAlgInstId—The algorithm instance identifier.

uiAlgMsg—ALG_UNLOAD_CAPTURE.

lparam1—Undefined.

lparam2—Undefined.

ALG_GETINFO

Video driver 206 sends an ALG_GETINFO message to instruct the algorithm DLL to provide information describing the algorithm DLL. The algorithm DLL fills in the ICINFO structure passed. The values of the alg_proc() parameters associated with ALG_GETINFO are:

dwAlgInstId—The algorithm instance identifier.
uiAlgMsg—ALG_GETINFO.
lparam1—A far pointer to the ICINFO structure of Microsoft® VfW.
lparam2—Undefined.

ALG_DECOMPRESS_QUERY

Video driver 206 sends an ALG_DECOMPRESS_QUERY message to query the algorithm DLL to determine if the algorithm DLL can decompress a specific input format, or if the algorithm DLL can decompress the input format to a specific output format. The values of the alg_proc() parameters associated with ALG_DECOMPRESS_QUERY are:

dwAlgInstId—The algorithm instance identifier.
uiAlgMsg—ALG_DECOMPRESS_QUERY.
lparam1—Far pointer to the Microsoft® VfW BITMAPINFOHEADER of the input bitmap.
lparam2—Far pointer to the Microsoft® VfW BITMAPINFOHEADER of the output bitmap.

ALG_DECOMPRESS_GET_FORMAT

To playback a video image, video driver 206 sends an ALG_DECOMPRESS_GET_FORMAT message to query the algorithm DLL to determine the format of the decorepressed data. The values of the alg_proc() parameters associated with ALG_DECOMPRESS_GET_FORMAT are:

dwAlgInstId—The algorithm instance identifier.
uiAlgMsg—ALG_DECOMPRESS_GET_FORMAT.
lparam1—Far pointer to a INOUTBIH structure.
lparam2—Far pointer to a DWORD to be filled in with the decompressed bitmap size.

The INOUTBIH structure contains the following parameters:

BITMAPINFO FAR * pIn—Far pointer to a Microsoft® VfW BITMAPINFO structure.
BITMAPINFO FAR * pOut—Far pointer to another Microsoft® VfW BITMAPINFO structure.

ALG_GET_ENCODE_FORMAT

Video driver 206 sends an ALG_GET_ENCODE_FORMAT message to inform the algorithm DLL of the format to be used by the algorithm DLL to compress the input video. The values of the alg_proc() parameters associated with ALG_GET_ENCODE_FORMAT are:

dwAlgInstId—The algorithm instance identifier.
uiAlgMsg—ALG_GET_ENCODE_FORMAT.
lparam1—Far Pointer to the Microsoft® VfW BITMAPINFOHEADER structure.
lparam2—Undefined.

ALG_VIDEO_FORMAT_DIALOG

The user has the option of setting various capture parameters, such a contrast, tint and brightness, from a dialog box. Video driver 206 provides this information to the algorithm DLL by the ALG_VIDEO_FORMAT_DIALOG message. The values of the alg_proc() parameters associated with ALG_VIDEO_FORMAT_DIALOG are:

dwAlgInstId—The algorithm instance identifier.
uiAlgMsg—ALG_VIDEO_FORMAT_DIALOG.
lparam1—Handle to the video effects dialog box.
lparam2—Undefined.

ALG_PREDECODE

Before the decode of each frame, video driver 206 sends an ALG_PREDECODE message to instruct the algorithm DLL to copy the compressed data from the VfW host buffer into VRAM using the *pfHost2Vram function. The values of the alg_proc() parameters associated with ALG_PREDECODE are:

dwAlgInstId—The algorithm instance identifier.
uiAlgMsg—ALG_PREDECODE.
lparam1—Far pointer to PREDECODE_PARMS structure.
lparam2—Undefined.

The PREDECODE_PARMS structure contains the following parameters:

CODEC_ARGS FAR *pCA—Pointer to parameters needed by decode microcode.
WORD CodecArgsSize—Size of parameters needed by decode microcode.
void HUGE *pFrameData—Pointer to compressed frame data.
DWORD FrameDataSize—Size of compressed frame data

ALG_PREENCODE

Video driver 206 sends an ALG_PREENCODE message before the encode of each frame. The values of the alg_proc() parameters associated with ALG_PREENCODE are:

dwAlgInstId—The algorithm instance identifier.
uiAlgMsg—ALG_PREENCODE.
lparam1—Undefined.
lparam2—Undefined.

ALG_POSTENCODE

Video driver 206 sends an ALG_POSTENCODE message after the encode of each frame to instruct the algorithm DLL to copy the encoded data from VRAM into a VFW host buffer using the *pfVram2Host function. The values of the alg_proc() parameters associated with ALG_POSTENCODE are:

dwAlgInstId—The algorithm instance identifier.
uiAlgMsg—ALG_POSTENCODE.
lparam1—Far pointer to POSTENCODE_PARMS structure.
lparam2—Undefined.

The POSTENCODE_PARMS structure contains the following parameters:

CODEC_ARGS FAR *pCA—Pointer to parameters needed by decode microcode.
WORD CodecArgsSize—Size of parameters needed by decode microcode.
VIDEOHDR FAR *pVidHdr—Pointer to a Windows VIDEOHDR structure.

ALG_GET_PIXELS_PER_SECOND

Video driver 206 sends an ALG_GET_PIXELS_PER_SECOND message when it wants to know how fast the video algorithm microcode 630 can compress an image. The values of the alg_proc() parameters associated with ALG- _GET_PIXELS_PER_SECOND are:

dwAlgInstId—The algorithm instance identifier.

uiAlgMsg—ALG_GET_PIXELS_PER_SECOND.

lparam1—Undefined.

lparam2—Undefined.

ALG_SET_QUALITY

Video driver 206 sends an ALG_SET_QUALITY message when it wants to adjust the quality of the compression/decompression algorithm. The values of the alg_proc() parameters associated with ALG_SET_QUALITY are:

dwAlgInstId—The algorithm instance identifier.

uiAlgMsg—ALG_SET_QUALITY.

lparam1—Quality (0–100).

lparam2—Undefined.

MEMORY SPACE MANAGEMENT

Memory manager 606 manages the allocation of memory within VRAM 120. During decompression and display processing, video driver 206 uses VRAM 120 to store the compressed bitstreams received from Microsoft® Video for Windows, the decompressed bitmaps generated by programmable processor 118, and the scaled bitmaps generated by display hardware module 122. During capture and compression processing, video driver 206 uses VRAM 120 to store the raw "full flame" uncompressed capture bitmaps generated by capture hardware module 116 and the compressed bitstreams and companded bitmaps generated by programmable processor 118. Memory manager 606 orchestrates the allocation and fleeing of linear memory space in VRAM 120 to store efficiently the two-dimensional bitmaps and linear bitstreams used and generated during the video data processing.

IMPLEMENTATION OF COPY/SCALE FUNCTION

Copy/scale manager 616 manages the copy/scale function in which unscaled bitmaps are scaled for display on monitor 108 as video images with dimensions (i.e., height and width) different from those of the unscaled bitmaps. The unscaled bitmaps used to generate the scaled bitmaps may be; the decompressed bitmaps generated by programmable processor 118 during decompression and display processing. They may also be either the raw "full frame" uncompressed bitmaps generated by capture hardware module 116 or the companded bitmaps generated by programmable processor 118 during capture and compression processing with monitoring activated.

IMPLEMENTATION OF FULL-SCREEN DISPLAY OPTION

Figure 7:
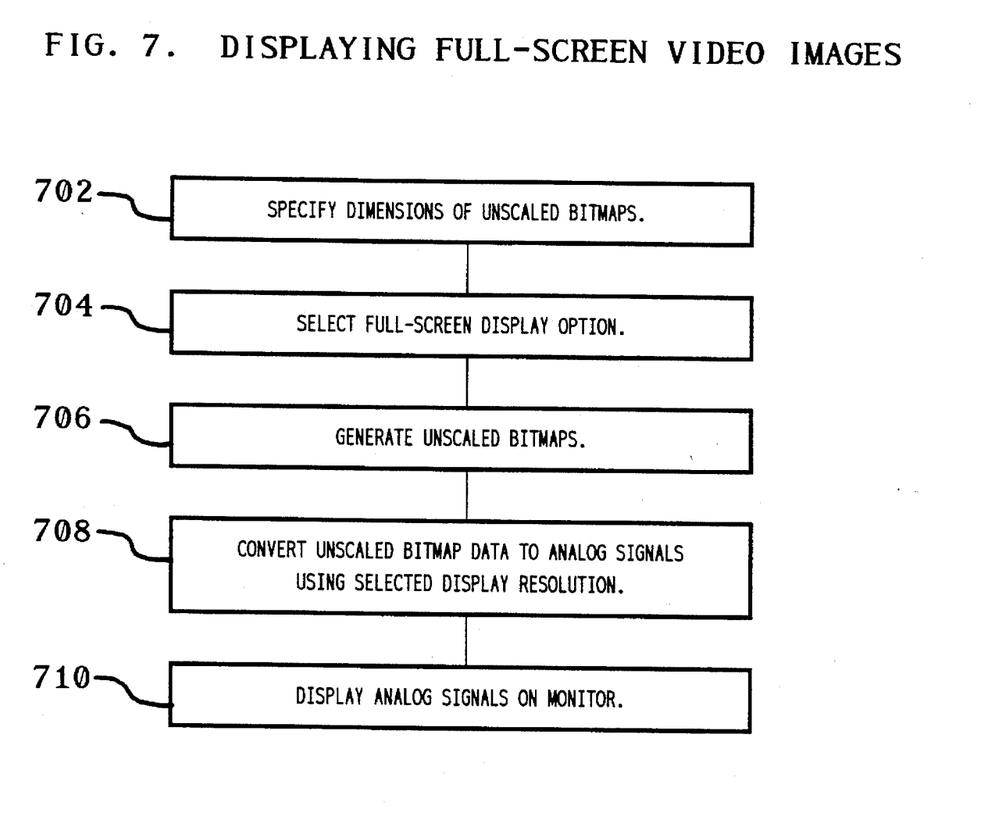
FIG. 7 is a process flow diagram of the processing implemented by the video system of FIGS. 1 and 2 to display full-screen video images.

Referring now to FIG. 7, there is shown a process flow diagram of the processing managed by view manager 608 to display full-screen video images, according to a preferred embodiment of the present invention. View manager 608 provides the ability to display unscaled bitmaps as full-screen video images without performing the copy/scale function.

After the dimensions of the unscaled bitmaps are specified (block 702 of FIG. 7) and the full-screen display option is selected (block 704), unscaled bitmaps of the specified dimensions are generated (block 706) and convened to analog signals for display with the resolution of the display selected automatically by view manager 608 based on the dimensions of the unscaled bitmap and the dimensions of the display raster (block 708). The resulting analog signals are displayed on monitor 108 (block 710) as full-screen images. The unscaled bitmaps generated at block 706 may be either decorepressed bitmaps (generated at block 308 of FIG. 3), raw uncompressed bitmaps (generated at block 404 of FIG. 4), or companded bitmaps (generated at block 406 of FIG. 4). In a preferred embodiment, display hardware module 122 is capable of arbitrarily adjusting raster resolution.

Those skilled in the art will understand that view manager 608 provides efficient display of full-screen video images by avoiding the copy/scale function. In a preferred embodiment, when the full-screen display option is selected, the video data are displayed without VGA keying and therefore without any merging of graphics data. View manager 608 supports full-screen video display of unscaled bitmaps of arbitrary dimensions.

CLIPPING VIDEO WINDOWS

Clipping manager 614 handles the clipping of video data associated with overlapping windows in a windowed environment.

COFF FILE PARSER

Common object file format (COFF) file parser 612 loads and converts an object file (as stored on host memory 110) into a form that programmable processor 118 can run.

MANAGING INTERRUPT SERVICE ROUTINES

The interrupt service routine manager 620 runs when the video hardware generates an interrupt. The interrupt service routine manager 620 then calls the appropriate module in video driver 206.

CAPTURING ANALOG VIDEO SIGNALS

Capture manager 618 manages the capture of analog video signals from camera 102 as raw "full frame" uncompressed bitmaps in VRAM 120 by capture hardware module 116.

MANAGING PLUG & PLAY CAPABILITIES

Plug & play manager 622 provides plug & play capabilities that are designed to make installation of the hardware as simple as possible for the end user. Preferably, a certain amount of hardware and PC configuration happens before the hardware may be used. The plug & play manager 622 follows the guidelines set forth in the following documents: Plug & Play Device Driver Interface Specification for Microsoft® Windows 3.1 and MS-DOS (Jun. 9, 1993 version 1.0 a) and Plug & Play ISA Specification by Intel Corporation (copyright 1993—Intel Corporation & Microsoft Corporation, version 1.01 (EEPROM draft), Jun. 18, 1993).

Video driver 206 is designed to be easily reconfigured to support modifications and upgrades to video hardware subsystem 104. Hardware interface 626 (a hardware abstraction layer) and plug & play software 628 contain most of the hardware-specific information for video driver 206. As such, when video hardware subsystem 104 is modified, most of the changes to video driver 206 will be made only to hardware interface 626 and plug & play software 628.

MANAGEMENT OF BACKGROUND AND FOREGROUND COMMANDS

When video system 100 displays video data on raster-based VGA monitor 108, the video data is processed and stored to VRAM 120 at various stages in the process. For example, during monitoring of capture and compression processing, raw uncompressed bitmaps, compressed bitstreams, companded bitmaps, and scaled bitmaps are all stored to VRAM 120.

The video data to be displayed on monitor 108 are stored in display bitmaps. During normal processing, the display bitmaps are the scaled bitmaps generated by programmable processor 118 during the copy/scale function. When the full-screen display option is selected, the display bitmaps may be the raw uncompressed bitmaps, the companded bitmaps, or the decompressed bitmaps, depending on the processing and monitoring options selected. In any case, the display bitmaps contain the video data to be converted to analog signals for display on monitor 108.

The current display bitmap is displayed on monitor 108 by reading the video data in a rasterized manner, i.e., one pixel at a time from left to right and one row at a time from top to bottom. When the bottom right corner of the current display bitmap is reached, the process returns to the top left corner to repeat the raster scan for the next display bitmap. The period between the end of the raster display for the current display bitmap and the beginning of the raster display for the next display bitmap is called the vertical blanking interval (VBI).

In a preferred embodiment of the present invention, the video data for each display bitmap are written over the video data for the immediately preceding display bitmap. If new video data are being written at the same time as the display bitmap area is being raster scanned, then the display of a single video image may contain data from two different video frames. To avoid this undesirable result, video system 100 supports the use of two types of commands: background commands and foreground commands.

Background commands do not directly change the display bitmaps, while foreground commands do directly change the display bitmaps. For example, in capture and compression processing with monitoring of companded bitmaps selected, a command to capture new uncompressed bitmaps does not directly change the display bitmaps. Such a command is preferably a background command. On the other hand, a command to copy/scale companded bitmaps for display does directly change the display bitmaps and is preferably a foreground command.

To avoid the problems of displaying display bitmap data from two different video frames, foreground commands are preferably implemented only during the vertical blanking interval. Background commands, on the other hand, may be implemented at any time. In a preferred embodiment, background commands are contained in a single background command list and foreground commands are contained in a single foreground command list. The single background and foreground command lists contain all of the background and foreground commands, respectively, even when video system 100 displays two or more video streams at the same time.

Figure 8:
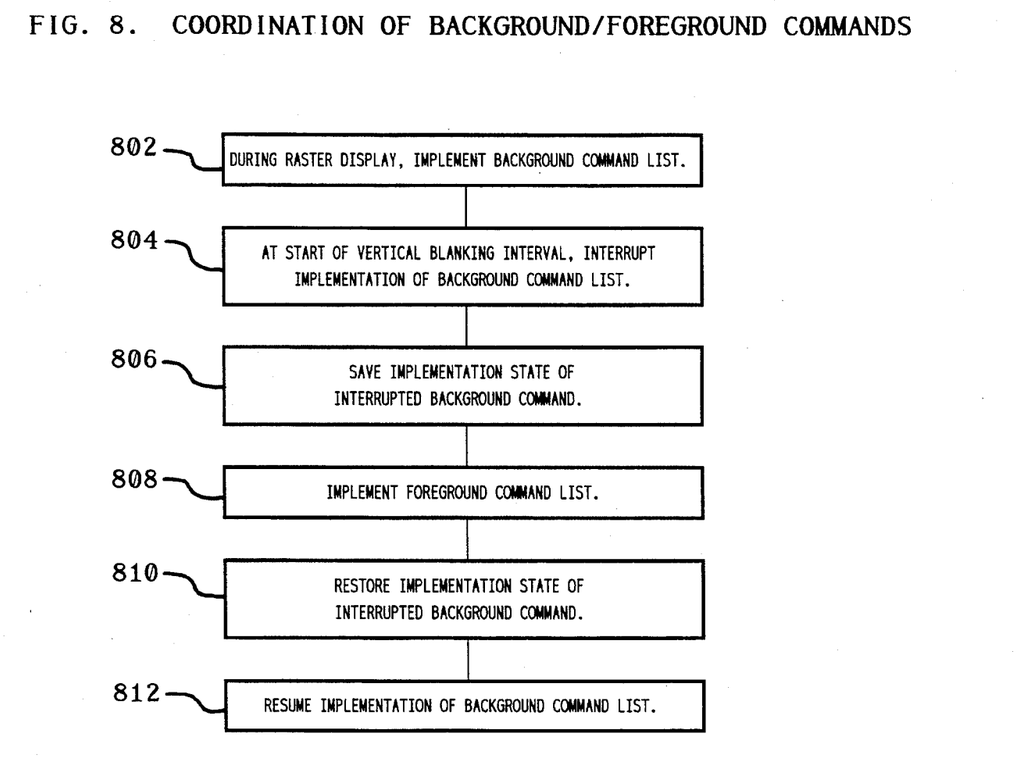
FIG. 8 is a process flow diagram of the processing of the run process manager of the video driver of FIG. 2 to coordinate the implementation of commands contained in the background and foreground command lists.

Referring now to FIG. 8, there is shown a process flow diagram of the processing of run process manager 624 of FIG. 6 (part of video driver 206 running on host processor 110) to coordinate the implementation of commands contained in the background and foreground command lists, according to a preferred embodiment of the present invention. During raster display, the background commands in the background command list are implemented (block 802 of FIG. 8).

At the start of a vertical blanking interval, the implementation of background command list is interrupted (block 804) and the implementation state of any interrupted background command is saved (block 806). The foreground command list is then implemented (block 808). Implementation of the foreground command list is preferably completed during the VBI. After implementation of the foreground command list is complete, the implementation state of the interrupted background command is restored (block 810) and the implementation of the background command list is resumed (block 812).

MANAGEMENT OF MICROCODE OUTSIDE VIDEO FOR WINDOWS ENVIRONMENT

Video processing systems are typically provided with microcode to implement particular video processing algorithms. In a preferred embodiment of the present invention, video driver microcode 634 of FIG. 6 is the video processing microcode provided with video driver 206 and video hardware subsystem 104. Video driver microcode 634 is the part of video driver 206 that runs on programmable processor 118. Video driver microcode 634 implements video processing functions such as copy/scale.

Microcode manager 610 provides the capability of using video driver 206 to program programmable processor 118 of video hardware subsystem 104 to perform data processing other than the video data processing supported by microcode 634 provided with video hardware subsystem 104. Microcode manager 610 allows a user to load and run loadable microcode 632 on programmable processor 118 outside the environment created by a general-purpose video software program such as Microsoft® Video for Windows.

Microcode manager 610 allows two or more concurrent and independent application programs to run different microcode programs on programmable processor 118, where none, one, or more of the microcode programs are related to video processing. Video driver 206 manages the swapping of the microcode programs between programmable processor 118 and VRAM 120.

Microcode manager 610 can be accessed through the loadable microcode interface (LMI). This interface is used to allocate VRAM through memory manager 606, get view information through view manager 608, and load microcode through microcode manager 610. The LMI interface is defined as follows:

```
OpenDriver (LPCSTR Driver, LPCSTR Section, LPARAM lParam2)
     Driver       - name of the driver to load.
     Section      - section to find driver in SYSTEM.INI.
     lParam2      - pointer to LMI_OPEN_PARMS structure.
     Returns      - handle to driver to use in future calls.
     Description  This call will open the driver in such a way as to allow access
                  to the Loadable Microcode Interface (LMI).
CloseDriver (HDRVR Driver, LPARAM lParam1, LPARAM lParam2)
     Driver       - Handle of driver to close, previously returned from a call to
                  OpenDriver( ).
```

-continued

| | |
|---|---|
| Description | This call closes the driver, no further access is permitted using driver. |

SendDriverMessage (HDRVR Drv, UINT msg, DWORD lParm1, DWORD lParm2)
    Drv    - Handle to previously opened driver.
    msg    - One of the following messages for an LMI driver.
        LMI_INIT
        LMI_TERM
        LMI_ALLOC_VMEM
        LMI_FREE_VMEM
        LMI_VMEM_TO_HOST
        LMI_HOST_TO_VMEM
        LMI_GET_VMEM_DWORD
        LMI_PUT_VMEM_DWORD
        LMI_GET_VMEM_WORD
        LMI_PUT_VMEM_WORD
        LMI_LOAD_MCODE
        LMI_UNLOAD_MCODE
        LMI_RUN_PROCESS
        LMI_GET_VIEW_INFO
    lParm1    - Defined below, different for each message.
    lParm2    - Defined below, different for each message.
    Description    This call sends a message to a previously opened driver. The messages for an LMI driver are as follows.
        LMI_INIT - Initializes usage to the driver.
            Parm1 ----- void
            Parm2 ----- void
            Return ----- 0 if ok
        LMI_TERM - Terminates usage to the driver.
            Parm1 ----- void
            Parm2 ----- void
            Return ----- 0 if ok
        LMI_ALLOC_VMEM - Allocates video memory.
            Parm1 ----- DWORD, Size to allocate
            Parm2 ----- DWORD, Alignment (4=DWORD)
            Return ----- DWORD, VRAM address, −1 bad
        LMI_FREE_VMEM - Frees allocated video memory.
            Parm1 ----- DWORD, VRAM address
            Parm2 ----- void
            Return ----- 0 if ok
        LMI_VMEM_TO_HOST - Copies VRAM to host memory.
            Parm1 ----- pointer to TRANSBLOCK
            Parm2 ----- void
            Return ----- 0 if ok
            TRANSBLOCK {
                WORD pointer Host- Host buffer
                DWORD HostOffset - Offset buffer
                DWORD VAddr - VRAM source address
                DWORD Size - Number of bytes to copy
            }
        LMI_HOST_TO_VMEM - Copies host memory to VRAM.
            Parm1 ----- Pointer to TRANSBLOCK
            Parm2 ----- void
            Return ----- 0 if ok
            TRANSBLOCK {
                WORD pointer Host - Host source buffer
                DWORD HostOffset - Offset into buffer
                DWORD VAddr - VRAM address
                DWORD Size - Number of bytes to copy
            }
        LMI_GET_VMEM_DWORD - Gets a VRAM DWORD.
            Parm1 - DWORD, video memory address
            Parm2 - void
            Return - DWORD, value at video memory address
        LMI_PUT_VMEM_DWORD - Puts a DWORD into VRAM.
            Parm1 - DWORD address to put DWORD
            Parm2 - DWORD value to place in VRAM.
            Return - 0 if ok
        LMI_GET_VMEM_WORD - Gets a VRAM WORD.
            Parm1 - DWORD, video memory address
            Parm2 - void
            Return - WORD, value at VRAM address
        LMI_PUT_VMEM_WORD - Puts a WORD into VRAM.
            Parm1 - DWORD address to put WORD
            Parm2 - WORD value to place in VRAM
            Return - 0 if ok
        LMI_GET_VIEW_INFO - Gets view information.
            Parm1 - void
            Parm2 - void
            Return - VIEWINFO pointer, view descriptor
            VIEWINFO{

```
                DWORD YAddr, VAddr, UAddr
                WORD YPitch, VPitch, Upitch
                WORD XSubsample, YSubsample
                WORD xpixels, ypixels
        }
    LMI_LOAD_MCODE - Loads microcode into VRAM.
        Parm1 - LPSTR, name of microcode to load
        Parm2 - HMODULE, module containing microcode
        Return - DWORD VRAM address of microcode, -1 if load
        failed
        Note: Microcode must be a resource in the module referenced
        by Parm2
    LMI_UNLOAD_MCODE - Unloads microcode from VRAM.
        Parm1  - DWORD, VRAM address of microcode
        Parm2  - void
        Return - 0 if ok
    LMI_RUN_PROCESS - Runs microcode loaded in VRAM.
        Parm1 - PROCBLOCK pointer, process block
        Parm2 - void
        Return - 0 if ok
        PROCBLOCK {
            LMI_CMD_BLOCK pointer {
                DWORD Addr - Address of microcode
                WORD nBytes - bytes following
            }
            int ExecutionPriority - either background or foreground
            int (pointer NotifyFunction)(
                    DWORD User1
                    DWORD User2
                    LMI_CMD_BLOCK pointer pCmd
            );
            DWORD User1 - passed to callback
            DWORD User2 - passed to callback
            int NotifyPriority - High or Low
            DWORD ProcessID - Rerurned process id
        }
```

It will be further understood that various changes in the details, materials, and arrangements of the pans which have been described and illustrated in order to explain the nature of this invention may be made by those skilled in the an without departing from the principle and scope of the invention as expressed in the following claims.

What is claimed is:

1. A computer-implemented process, comprising the steps of:

(a) loading a first microcode program of a first application program onto memory in an Intel® i750™ Pixel Processor, wherein the first application program runs on a host processor;

(b) running the first microcode program on the Intel® i750™ Pixel Processor;

(c) unloading the first microcode program from the memory of the Intel® i750™ Pixel Processor;

(d) loading a second microcode program of a second application program onto the memory in the Intel® i750™ Pixel Processor, wherein the second application program runs on the host processor;

(e) running the second microcode program on the Intel® i750™ Pixel Processor;

(f) unloading the second microcode program from the memory of the Intel® i750™ Pixel Processor;

(g) repeating steps (a) through (f), wherein the first and second application programs run concurrently on the host processor.

2. The process of claim 1, wherein step (b) comprises the step of running the first microcode program to implement video processing.

3. The process of claim 2, wherein step (e) comprises the step of running the second microcode program to implement video processing.

4. The process of claim 2, wherein step (e) comprises the step of running the second microcode program to implement non-video processing.

5. The process of claim 1, wherein step (b) comprises the step of running the first microcode program to implement non-video processing.

6. The process of claim 5, wherein step (e) comprises the step of running the second microcode program to implement non-video processing.

7. The process of claim 1, wherein steps (a) through (h) are controlled by a driver running on the host processor.

8. The process of claim 7, wherein the first and second microcode programs comprise separate libraries external to the driver.

9. The process of claim 1, wherein the first and second microcode programs are dynamically linked libraries.

10. A driver for a computer system, comprising:

(a) means for loading a first microcode program of a first application program into memory of an Intel® i750™ Pixel Processor and for loading a second microcode program of a second application program into the memory of the Intel® i750™ Pixel Processor;

(b) means for running the first microcode program on the Intel® i750™ Pixel Processor and for running the second microcode program on the Intel® i750™ Pixel Processor;

(c) means for unloading the first microcode program from the memory of the Intel® i750™ Pixel Processor and for unloading the second microcode program from the memory of the Intel® i750™ Pixel Processor, wherein the first and second application programs run concurrently on a host processor.

11. The driver of claim 10, wherein means (b) comprises means for running the first microcode program to implement video processing.

12. The driver of claim 11, wherein means (b) comprises means for running the second microcode program to implement video processing.

13. The driver of claim 11, wherein means (e) comprises means for running the second microcode program to implement non-video processing.

14. The driver of claim 10, wherein means (a) through (c) comprise a driver running on a host processor.

15. The driver of claim 14, wherein the first and second microcode programs comprise separate libraries external to the driver.

16. The driver of claim 10, wherein means (b) comprises means for running the first microcode program to implement non-video processing.

17. The driver of claim 10, wherein means (b) comprises means for running the second microcode program to implement non-video processing.

18. The driver of claim 10, wherein the first and second microcode programs are dynamically linked libraries.

19. The driver of claim 10, wherein the driver processes LMI_INIT and LMI_TERM messages.

20. The driver of claim 10, wherein the driver processes LMI_ALLOC_VMEM and LMI_FREE_VMEM messages.

21. The driver of claim 10, wherein the driver processes LMI_VMEM_TO_HOST and LMI_HOST_TO_VMEM messages.

22. The driver of claim 10, wherein the driver processes LMI_GET_VMEM_DWORD, LMI_PUT_VMEM_DWORD, LMI_GET_VMEM_WORD, and LMI_PUT_VMEM_WORD messages.

23. The driver of claim 10, wherein the driver processes LMI_LOAD_MCODE and LMI_UNLOAD_MCODE messages.

24. The driver of claim 10, wherein the driver processes LMI_RUN_PROCESS messages.

25. The driver of claim 10, wherein the driver processes LMI_GET_VIEW_INFOR messages.

26. A computer system for processing data, comprising:
(a) a host processor;
(b) an Intel® i750™ Pixel Processor;
(c) a driver, running on the host processor, for providing an interface with the Intel® i750™ Pixel Processor;
(d) a first application program running on the host processor;
(e) a second application program running on the host processor;
(f) a first microcode program of the first application program; and
(g) a second microcode program of the second application program, wherein:
the driver:
(1) loads the first microcode program onto memory of the Intel® i750™ Pixel Processor;
(2) runs the first microcode program on the Intel® i750™ Pixel Processor;
(3) unloads the first microcode program from the memory of the Intel® i750™ Pixel Processor;
(4) loads the second microcode program onto the memory of the Intel® i750™ Pixel Processor;
(5) runs the second microcode program on the Intel® i750™ Pixel Processor;
(6) unloads the second microcode program from the memory of the Intel® i750™ Pixel Processor;
(7) repeats steps (1) through (6), wherein the first and second application programs run concurrently on the host processor.

27. The system of claim 26, wherein the driver runs the first microcode program to implement video processing.

28. The system of claim 27, wherein the driver runs the second microcode program to implement video processing.

29. The system of claim 27, wherein the driver runs the second microcode program to implement non-video processing.

30. The system of claim 26, wherein the driver runs the first microcode program to implement non-video processing.

31. The system of claim 30, wherein the driver runs the second microcode program to implement non-video processing.

32. The system of claim 26, wherein the first and second microcode programs are dynamically linked libraries.

33. The system of claim 26, wherein the first and second microcode programs comprise separate libraries external to the driver.

34. The system of claim 26, wherein the driver processes LMI_INIT and LMI_TERM messages.

35. The system of claim 26, wherein the driver processes LMI_ALLOC_VMEM and LMI_FREE_VMEM messages.

36. The system of claim 26, wherein the driver processes LMI_VMEM_TO_HOST and LMI_HOST_TO_VMEM messages.

37. The system of claim 26, wherein the driver processes LMI_GET_VMEM_DWORD, LMI_PUT_VMEM_DWORD, LMI_GET_VMEM_WORD, and LMI_PUT_VMEM_WORD messages.

38. The system of claim 26, wherein the driver processes LMI_LOAD_MCODE and LMI_UNLOAD_MCODE messages.

39. The system of claim 26, wherein the driver processes LMI_RUN_PROCESS messages.

40. The system of claim 26, wherein the driver processes LMI_GET_VIEW_INFOR messages.

* * * * *